Oct. 20, 1925.

J. A. BRIED

SLIDING JAW CLUTCH

Filed Dec. 6, 1921

1,558,074

INVENTOR.

Julien A. Bried

Patented Oct. 20, 1925.

1,558,074

UNITED STATES PATENT OFFICE.

JULIEN A. BRIED, OF OAKLAND, CALIFORNIA, ASSIGNOR OF ONE-HALF TO SAMUEL L. ROGERS, OF SAN FRANCISCO, CALIFORNIA.

SLIDING-JAW CLUTCH.

Application filed December 6, 1921. Serial No. 520,363.

*To all whom it may concern:*

Be it known that I, JULIEN A. BRIED, a citizen of the United States, residing at Oakland, in the county of Alameda and State of California, have invented a new and useful Improvement in the Construction of Sliding-Jaw Clutches, of which the following is a specification and which is illustrated in the accompanying drawings.

My invention relates to sliding jaw clutches as used to transmit power from one rotary element mounted on a shaft to another rotary element on the same shaft, and the improvement has particular reference to such clutches when used to actuate a loose gear wheel mounted on a common shaft and has for its principal objects simplified construction in using the gear teeth themselves as a clutch, a jaw clutch which will automatically release itself through the reaction of the power being transmitted upon releasing a restraining collar, and the avoidance of a spline or its equivalent as heretofore used in the shaft and sliding member of such a clutch.

Figure 3:
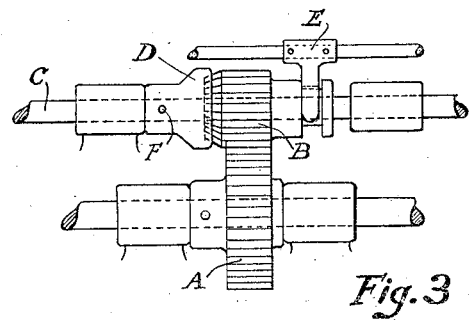
Figure 3 shows a spur gear pair with my clutch applied to a pinion having the teeth beveled where they engage the clutch.

In going into constructional details it may be well to call attention to the fact that heretofore all jaw clutches applied to gear wheels wherein the gear and co-operating clutch member are in axial alignment or supported on a common shaft, consisted of one half of the clutch attached to a loose gear, and the other half clutch splined to slide along the shaft. It is to avoid the necessity of splining the sliding member, and also to avoid the use of a half clutch attached to the gear and to secure an instantaneous emergency release in a jaw clutch, especially applicable to a power driven clothes wringer, that applicant's invention was evolved, and when used in its entirety as shown in Figs. 1 and 3, it accomplishes this combined result.

Figure 1:
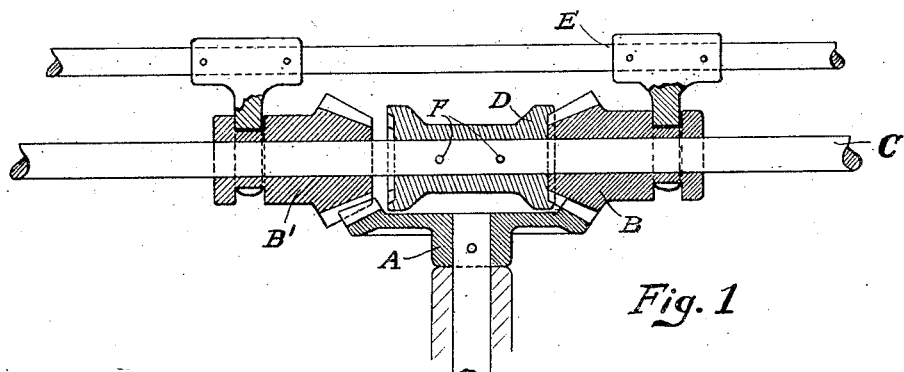
Fig. 1 shows, in axial cross section, the preferred arrangement of parts embodying my improvements enumerated and consists of a bevel gear set with a double ended clutch of my improved construction, with one pinion in clutch and one pinion out of clutch.

The automatic or instantaneous releasing effect is secured by having the engaging teeth of the opposite clutching members set at an angle so that the pressure on the teeth during the transmission of power tends to force them apart, the parts being forcibly held against this separation tendency by a suitable collar or yoke as shown at E in Figure 1. The required angularity of the engaging teeth may be secured in several ways, but easiest to secure by simply extending the teeth of bevel gears beyond their mating gears and using these extensions as jaw clutch teeth, the angle of the sides co-operating with the natural tooth form to effect a clutch which will not remain in engagement unless held to its work, for the greater the driving strain the greater will be its tendency to separate.

The invention consists primarily as shown in axial cross section in Fig. 1, of extending the teeth of a gear (the pinions B and B') beyond the working face of the mating gear A and using the tooth extensions as a clutch member to engage a power transmitting clutch member D recessed to freely receive the tooth extensions in locking engagement. The member D is affixed to the shaft C by the pins F.

In the figure one of the pinions B is shown with the extended ends of its teeth engaged with the clutch member D and in position to transmit power to or from the large gear A. The other pinion B' is shown disengaged from the clutch member D and therefore free or loose upon the shaft C. Engagement or disengagement is effected by means of the movable yoke E sliding the pinions in and out of clutching engagement with the clutch member D, though when power is being transmitted the disengagement is automatic upon release of the yoke E as explained above. The large number of teeth in contact when the clutch is engaged, as compared to the ordinary jaw clutch of two or three jaws, permits of a very shallow depth to the clutch as shown, consequently the pinions when withdrawn from clutch do not move far enough along the shaft to disengage the teeth of the gear A, and which though not in their correct working position when so withdrawn are sufficiently so for idling.

Figure 2:
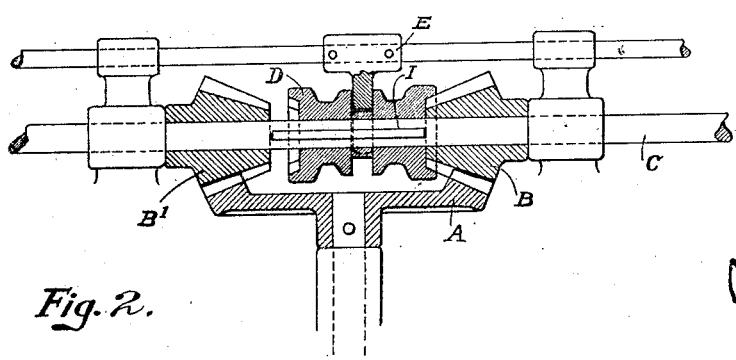
Fig. 2 shows, in axial cross section, a bevel gear set with a splined sliding clutch member, but employing the other feature of my invention, i. e. the extending gear teeth used in place of the other half of a jaw clutch.

In Fig. 2 is shown in axial cross section, a set of bevel gears similar to the set shown in Fig. 1 but using a sliding clutch member D splined at I to the shaft C.

Figure 2 does not show my invention in its entirety but shows it combined with a part of the earlier jaw clutch features.

In Figure 3 is shown a modified clutch arrangement wherein the extended clutch teeth of a spur pinion are beveled to seat themselves in a mating beveled member D to thereby gain the advantages of the automatic release as explained.

I claim:

A jaw clutch arrangement comprising a bevel gear fixed to a shaft, a second shaft at right angles thereto, a bevel gear loose on said second shaft in mesh with the first mentioned gear and having its teeth extending beyond the working face thereof, a power transmitting element on said second shaft adapted to engage the extending teeth of the second mentioned gear, and means for holding said element and gear in such engagement.

JULIEN A. BRIED.